US011375030B2

(12) United States Patent
Jiang et al.

(10) Patent No.: US 11,375,030 B2
(45) Date of Patent: Jun. 28, 2022

(54) FUTURE EVENT DETECTION AND NOTIFICATION

(71) Applicant: Oath Inc., New York, NY (US)

(72) Inventors: Junwei Jiang, Beijing (CN); Wenliang Cui, Beijing (CN); Qian Wan, Beijing (CN)

(73) Assignee: Yahoo Assets LLC, Dulles, VA (US)

( * ) Notice: Subject to any disclaimer, the term of this patent is extended or adjusted under 35 U.S.C. 154(b) by 675 days.

(21) Appl. No.: 16/278,670

(22) Filed: Feb. 18, 2019

(65) Prior Publication Data
US 2019/0182346 A1 Jun. 13, 2019

Related U.S. Application Data

(62) Division of application No. 14/657,409, filed on Mar. 13, 2015, now Pat. No. 10,212,243.

(51) Int. Cl.
*H04L 67/55* (2022.01)
*G10L 15/18* (2013.01)
*G10L 25/48* (2013.01)
*H04L 67/01* (2022.01)
*H04L 67/306* (2022.01)
*H04L 67/04* (2022.01)
*H04L 67/52* (2022.01)

(52) U.S. Cl.
CPC .......... *H04L 67/26* (2013.01); *G10L 15/1822* (2013.01); *G10L 25/48* (2013.01); *H04L 67/04* (2013.01); *H04L 67/18* (2013.01); *H04L 67/306* (2013.01); *H04L 67/42* (2013.01)

(58) Field of Classification Search
None
See application file for complete search history.

(56) References Cited

U.S. PATENT DOCUMENTS

| 2008/0046913 | A1* | 2/2008 | Dear | G06Q 30/02 725/24 |
| 2012/0016678 | A1* | 1/2012 | Gruber | G06F 16/9537 704/275 |
| 2013/0297688 | A1* | 11/2013 | Zheng | G06Q 30/0631 709/204 |
| 2014/0358632 | A1* | 12/2014 | Graff | G06Q 30/0224 705/7.29 |
| 2015/0127392 | A1* | 5/2015 | Shivakumar | G06Q 50/01 705/5 |

(Continued)

*Primary Examiner* — Alan Chen
(74) *Attorney, Agent, or Firm* — Cooper Legal Group LLC

(57) ABSTRACT

One or more methods and/or techniques for providing a personalized future event notification to a user are provided herein. A content item (e.g., a news article, a social network post, etc.) may be evaluated utilizing a future event detection model to identify a future event (e.g., a festival). The future event detection model may have been trained to identify future events based upon part of speech analysis and entity recognition analysis of text within content items. In an example, the future event detection model may be used to identify locational features, temporal features, and/or entities from the content item. A user having a user interest in the future event above an interest threshold may be identified based upon user identifying information (e.g., a social network profile) being indicative of user interest in the future event. A personalized future event notification of the future event may be provided to the user.

20 Claims, 11 Drawing Sheets

(56) References Cited

U.S. PATENT DOCUMENTS

| | | | |
|---|---|---|---|
| 2015/0188757 A1* | 7/2015 | Amidei | H04W 4/21 709/217 |
| 2015/0248651 A1* | 9/2015 | Akutagawa | G06F 16/2465 705/7.19 |
| 2016/0092581 A1* | 3/2016 | Joshi | G06F 16/3338 707/732 |

* cited by examiner

FUTURE EVENT DETECTION AND NOTIFICATION

CROSS REFERENCE TO RELATED APPLICATION

This application claims priority to and is a divisional of U.S. application Ser. No. 14/657,409, filed on Mar. 13, 2015, entitled "FUTURE EVENT DETECTION AND NOTIFICATION", which is incorporated herein.

BACKGROUND

The rate at which information is created in the world today continues to increase. There is so much information that cataloging/indexing, searching, and accessing the content becomes a challenge. For example, a user may attempt to identify a future event that may be interesting to the user (e.g., a football event, a local festival, an air show, etc.). In an example, the user may submit a search request, such as through a search engine or a social network, to identify content items that may be indicative of interesting future events. However, the user may receive search results that do not identify future events (e.g., a user may search for "upcoming local events" but may receive results for previously occurring local events as opposed to future local events) and/or search results for content items identifying future events are not interesting to the user (e.g., the user may have an interest in professional football game events, but may receive search results for high school football game events). Thus, the user may spend extensive amounts of time and/or computing resources searching for future events that may be interesting to the user and/or the user may not become aware of interesting future events. Moreover, the user may need to resubmit the search query on an hourly, daily, and/or weekly basis in order to obtain fresh search results comprising recently published content items. If the user does not find a relevant future event, then the user may miss out on learning about and/or attending the future event.

SUMMARY

In accordance with the present disclosure, a content item (e.g., an email message, a news article, a social network post, etc.) may be evaluated utilizing a future event detection model (e.g., a Gradient Boosting Decision Tree model, an XQuery Data Model, etc.) to identify a future event. A user having a user interest in the future event (e.g., a videogame convention) above an interest threshold may be identified based upon user identifying information (e.g., a current location of the user, a social network profile of the user such as a social network post "I love gaming conventions", previous activities of the user such as playing videogames on a new console, previous purchases by the user such as a purchase of the new console, etc.) being indicative of the user interest in the future event. A personalized future event notification, identifying the future event, may be provided to the user. In an example, the providing may comprise constructing a push notification identifying the future event and providing the push notification to a client device (e.g., a smartphone, a tablet, etc.) for display as a device alert notification. In an example, a save interface element used to save the personalized future event notification as a file, a bookmark, a task item, an email, a calendar item, and/or a reminder notification may be displayed to the user through a user interface. In an example, the save user interface element may comprise a calendar creation option, and in response to the user selecting the calendar creation option, a calendar entry may be created for the future event within a calendar associated with the user.

The future event detection model may be trained to identify future events based upon part of speech analysis and/or entity recognition analysis of text within content items. In an example, a part of speech analysis may be performed on a content item to generate a feature corresponding to least one of a subject, a predicate, an object, or an adverbial clause associated with a location (e.g., a convention center) and/or a future time (e.g., a date Jan. 12, 2016). In another example, entity recognition analysis may be performed to extract an entity (e.g., Convention Center ABC, Videogame Maker XYZ, Sport Racing Game Z, Videogame Console A, etc.) from the content item. A relevance score may be generated based upon an association between the entity and the feature. The relevance score may be used to train the future event detection model. For example, the future event may be identified in response to the relevance score exceeding a relevancy threshold. In an example, feedback may be received from the user regarding the personalized future event notification (e.g., feedback indicating the future event is invalid, valid, and/or interesting) and the future event detection model may be trained based upon the feedback.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. Computing Scenario

The following provides a discussion of some types of computing scenarios in which the disclosed subject matter may be utilized and/or implemented.

1.1. Networking

Figure 1:
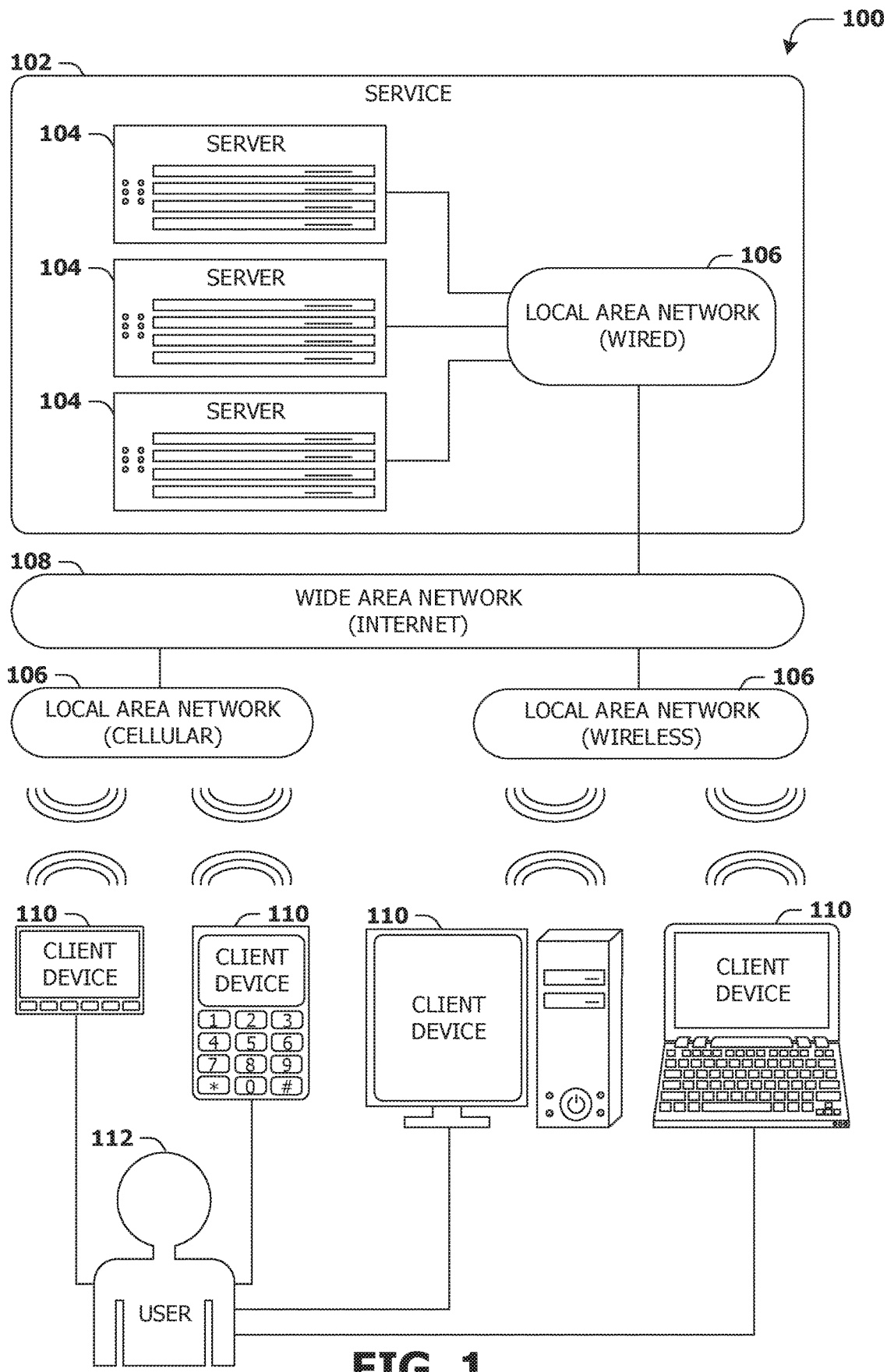
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
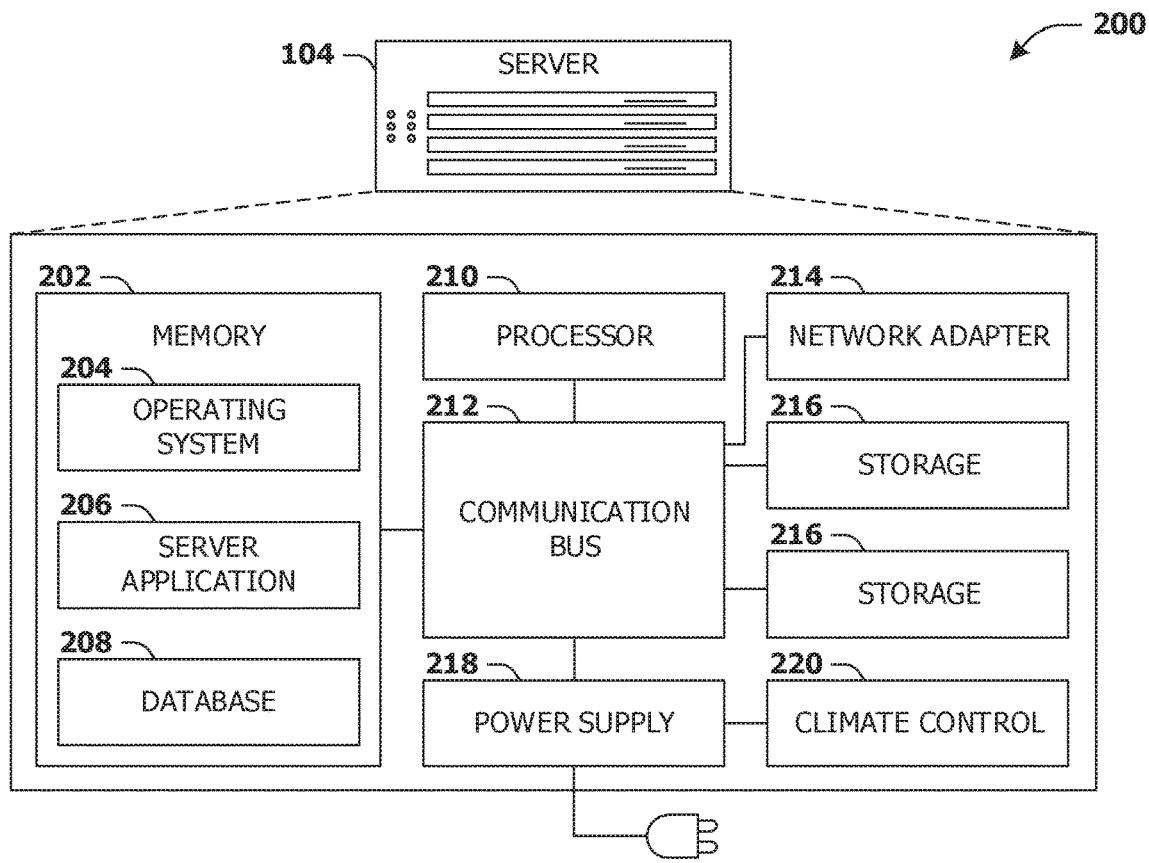
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
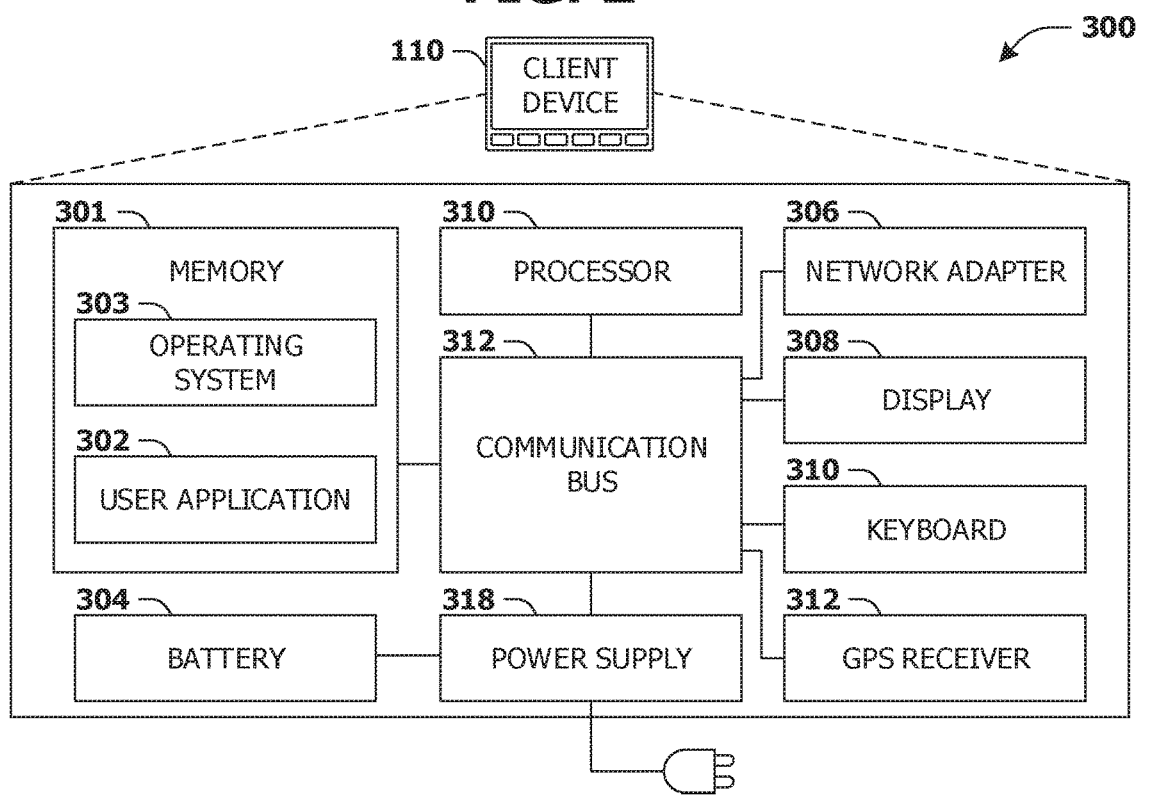
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for providing a personalized future event notification are provided herein. A user may submit a search request, such as through a search engine, to identify future events that may interest the user. The user may, responsive to receiving the search results, review content items to attempt to identify future events that correspond to the interest of the user. However, search results may often include past events and/or irrelevant and/or uninteresting future events that may not correspond to an interest of the user. As provided herein, a personalized future event notification identifying a future event may be provided to a user that may have an interest in the future event. In an example, a content item (e.g., a concert venue email, a social network post of a party, etc.) may be evaluated utilizing a future event detection model to identify the future event (e.g., a party, a meeting, an agenda of a person of interest, a rock concert, a birthday, etc.). The future event detection model (e.g., a Gradient Boosting Decision Tree model or an XQuery Data Model) may be trained to identify future events from text within content items based upon a part of speech analysis and/or an entity recognition analysis used to identify locational features (e.g., a convention center), temporal features (e.g., a date of a convention meeting), and/or entities (e.g., a Videogame Manufacturer that is hosting the convention meeting). A personalized future event notification (e.g., a push notification), identifying the future event, may be provided to a device of the user.

The ability to provide users with relevant personalized future event notification identifying future events may mitigate computing resources consumption (e.g., battery power consumption, processing resources, bandwidth, etc.) and/or time otherwise wasted by the user performing multiple searches in an attempt to identify future events that are interesting to the user (e.g., users may have to repeatedly search for future events on an hourly, daily, weekly, etc., basis to identify future events relevant to user interests of the users). Providing personalized future event notifications to users may aid users in quickly and efficiently identifying future events that are interesting and/or may aid users in identifying relevant future events that may have otherwise gone undiscovered (e.g., more content sources may be searched by the techniques provided herein than would have been searched by the user).

Figure 4:
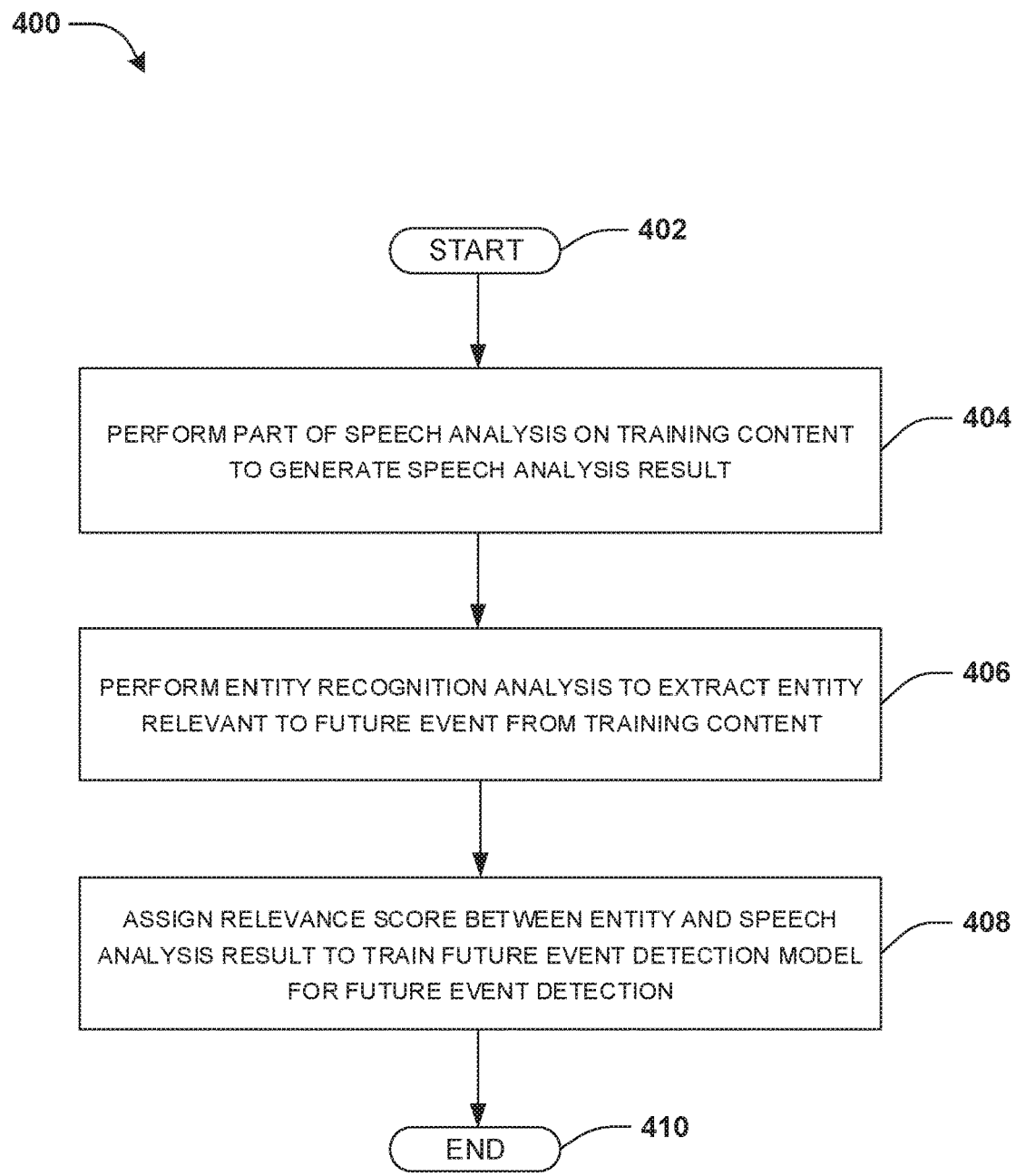
FIG. 4 is a flow chart illustrating an example method of training a future event detection model.

An embodiment of training a future event detection model is illustrated by an example method 400 of FIG. 4. At 402, the method 400 starts. At 404, a part of speech analysis may be performed on training content to generate a speech analysis result (e.g., tagging of words and/or phrases within the training content). In an example, the speech analysis result may identify a subject, a predicate, an object, and/or an adverbial clause that may correspond to a location (e.g., an address, global positioning coordinates, landmark, a building, a park, a store, a lake, a city, etc.) and/or a future time (e.g., a day, a time of day, a week, a range of days, etc.). For example, the part of speech analysis may be performed on text of the training content, such as a social network post "President Cecil will speak at the Smallville auditorium next Friday." The speech analysis result may identify "Smallville auditorium" as a locational feature and/or "next Friday" as a temporal feature. In an example, one or more words within the text of the training content may be tagged (e.g., annotated) as corresponding to a particular part of speech based on a definition of the word and/or the context (e.g., a correlation between adjacent and related words in the training content). In an example, the part of speech analysis may comprise a rule-based algorithm (e.g., a brill tagger), a neural algorithm, a stochastic algorithm, etc. utilized to tag text within the training material. In an example, an administrator may review and/or manually tag the training material to generate the speech analysis result.

At 406, an entity recognition analysis may be performed on the training content to extract an entity relevant to the future event. In an example, the entity may comprise a person (e.g., President Cecil), an organization (e.g., Congress), a product (e.g., a fighter aircraft), etc. In an example, the entity may be extracted from the training material by a named-entity recognition (NER) component. The NER component may extract the entity utilizing linguistic grammar-based techniques, statistical models (e.g., machine learning models), etc. The text of the content item may be annotated by the NER component to identify the entity (e.g., "President Cecil" may be identified/annotated as being a person/entity). In an example, the entity may be identified from the subject of the training content and the part of speech analysis result such as the future time and/or the location may be identified from the predicate of the training content.

At 408, a relevance score between the entity and the speech analysis result may be assigned. The relevance score may be used to train a future event detection model utilized for future event detection. In an example, the relevance score may be based upon meta information (e.g., metadata, tagging information, etc.) for the entity corresponding to the speech analysis result (e.g., the predicate) for the location and/or the future time. In an example, a relevance score machine learned model may be utilized to calculate the relevance score. The relevance score machine learned model may utilize a lexical database and a plurality of pre-tagged sentences to evaluate a relationship between the entity and the speech analysis result to generate the relevance score.

In an example, responsive to training the future event detection model, a content item (e.g., news article, blog post, etc.) may be evaluated utilizing the future event detection model to identify a future event. A user having a user interest in the future event above an interest threshold may be identified based upon user identifying information (e.g., a social network profile indicating an interest in politics, a previous purchase of a campaign donation, the user visiting a political blog website, etc.) being indicative of a user interest in the future event. A personalized future event notification (e.g., a push notification) for the future event may be provided to the user in response to the user interest for the future event being above the interest threshold. In an example, a calendar entry may be created for the future event within a calendar associated with the user in response to the user selecting a calendar creation option. In another example, the calendar entry may be created for the future event within the calendar automatically based upon a prior instruction from the user (e.g., a user may specify that future events relating to politics are to be automatically added to the calendar). At 410, the method 400 ends.

Figure 5:
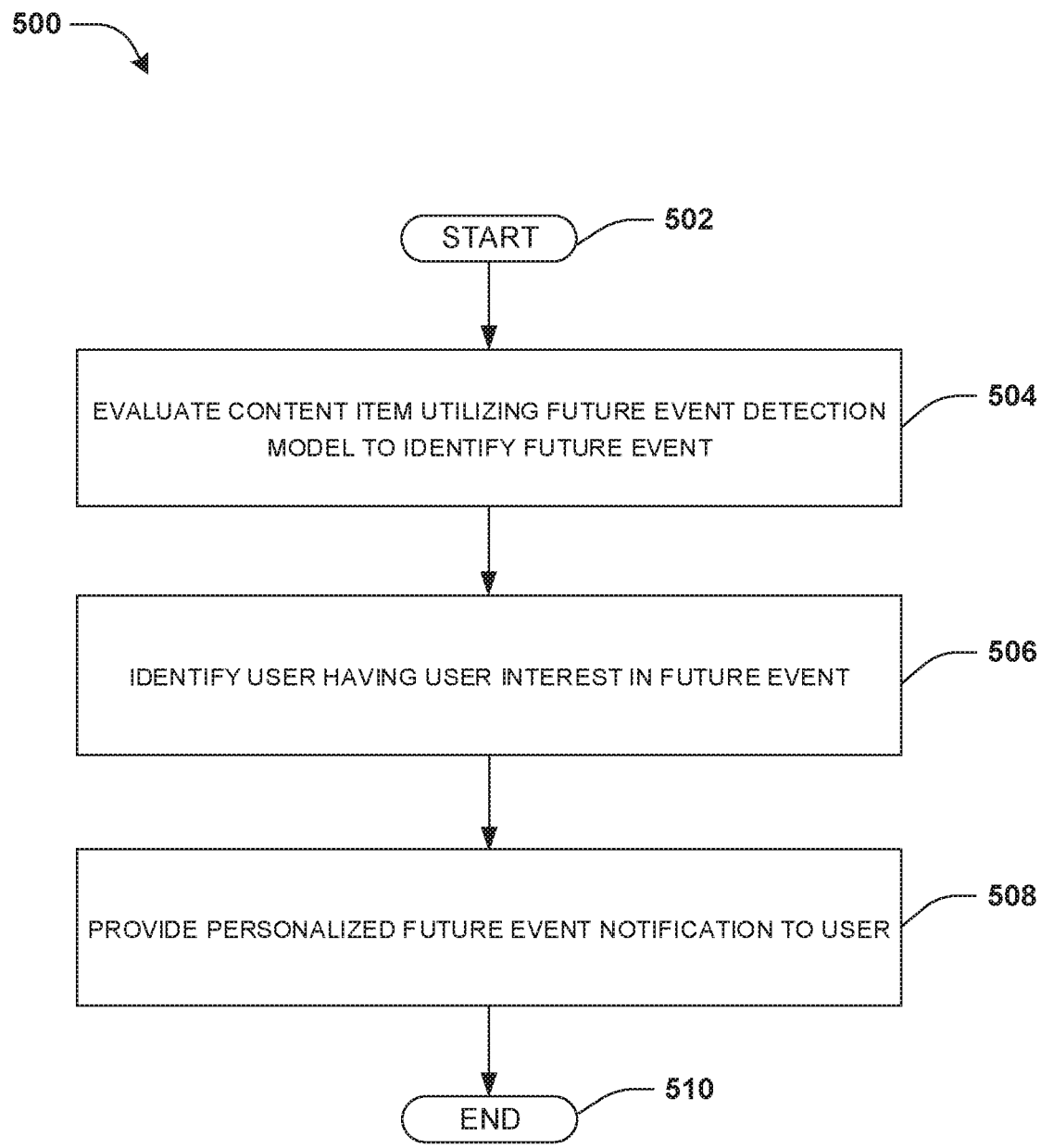
FIG. 5 is a flow chart illustrating an example method of providing a personalized future event notification to a user.

An embodiment of providing a personalized future event notification to a user is illustrated by an example method 500 of FIG. 5. At 502, the method 500 starts. At 504, a content item (e.g., a news article) may be evaluated to identify a future event (e.g., a football game event may be identified from a news article stating "The Pittsburgh football team will play the Texas football team three weeks from today at 8:00 pm in Pittsburgh, Pa."). In an example, the content item may be evaluated utilizing a future event detection model. The future event detection model may comprise a Gradient Boosting Decision Tree (GBDT) model, an XQuery Data Model (XDM), or any other model. In an example, the future event detection model may be trained, such as by the method 400, to identify future events from text within the content item based upon a part of speech analysis and an entity recognition analysis. For example, the part of speech analysis may be performed on the content item to generate a feature corresponding to least one of a subject, a predicate, an object, or an adverbial clause associated with a location and/or a future time (e.g., "3 weeks from today at 8:00 pm" may be identified as a future time feature and "Pittsburgh, Pa." may be generated as a location feature). The entity recognition analysis may be performed to extract an entity (e.g., Pittsburgh football team, Texas football team, etc.), which may be indicative of the future event, from the content item. A relevance score may be generated based upon an association between the entity and the feature. Responsive to the relevance score exceeding a relevancy threshold, the future event may be identified (e.g., a Pittsburgh verse Texas football game event on Nov. 14, 2014 at 8:00 pm).

In an example, the content item may comprise a news article, a blog post, news feed content, a social network post, website content, application user interface data, an email message, an instant message, a forum message, a social media message, an in-app message (e.g. a notification), a video message, a text message, and/or an audio message.

At 506, a user may be identified as having a user interest (e.g., a Texas football team interest) in the future event (e.g., the Pittsburgh verse Texas football game event) above an interest threshold. The user may be identified based upon user identifying information (e.g., a social media post stating "I love going to Texas football games", location information indicating the user is located in Pittsburgh, a previous purchase of football tickets, etc.) being indicative of a user interest in the future event. In an example, a user profile may be evaluated to identify information indicative of the user interest in the future event. The user profile may comprise information, such as age, gender, geographic location (e.g., Pittsburgh), previous activities of the user (e.g., joining and/or participating in fantasy football league), user created content of the user (e.g., a blog post directed to the history of football in Pittsburgh), browser history of the user (e.g., the user visiting a football statistics webpage), and/or other user trait information that may be indicative of an interest in the future event.

At 508, a personalized future event notification for the future event may be provided to the user. In an example, the personalized future event notification may be provided to a client device (e.g., a mobile device, such as a smartphone, a tablet, a smart watch, etc.) for displayed to the user through at least one of an email interface, a text message interface, an instant message interface, a website such as a web page interface, an application interface, a push notification interface, etc. For example, a push notification may be constructed to identify the personalized future event. The push notification may be provided to the client device for display as a device alert notification (e.g., through the push notification interface). The personalized future event notification may comprise various information. In an example, the personalized future event notification may comprise a link to a website such as to purchase tickets for the future event. In another example, the personalized future event notification comprises a user review or commentary for the future event or a previous instance of the future event. In another example, the personalized future event notification comprises a video trailer or preview for the future event. In another example, the personalized future event notification comprises a link to download an app associated with the future event (e.g., a football streaming app, a ticket reservation app, etc.). In another example, the personalized future event notification comprises a link to a social network profile of an entity associated with the future event (e.g., a link to follow a social network feed of the Texas football team).

In an example, a second content item may be evaluated to identify a second future event (e.g., a baseball game event). A user profile of the user may be evaluated to determine that the user has a greater interest in the future event than the second future event (e.g., the user profile may indicate an interest in football but not baseball). The personalized future event notification (e.g., a push notification) may be generated based upon the future event but not the second future event.

In an example, a set of future events may be identified from one or more content items. The set of future events may be ranked based upon the user profile of the user to create a ranked set of future events (e.g., the greater an interest the user has in a future event, the higher the rank). In an example, a ranked future event from the set of ranked future events may be provided to the user based upon a rank of the ranked future event (e.g., a football future event may receive a higher ranking score than a baseball future event, and thus the football future event may be provided to the user).

In an example, a personalized future event user interface may be displayed. The personalized future event user interface may be configured to allow the user to interact with the personalized future event notification (e.g., receive additional information regarding details of the future event, share the future event, comment on the future event, etc.). The personalized future event user interface may comprise a feedback user interface element used to provide feedback for the personalized future event notification (e.g., an ability to rate the relevancy of the personalized future event notification), a copy user interface element used to copy the personalized future event notification for pasting (e.g., copy a link to information regarding the future event, copy a link to a webpage associated with the future event, etc.), a save user interface element used to save the personalized future event notification (e.g., save the personalized future event notification as a file, a bookmark, a task item, an email, a calendar entry, a reminder notification, etc.), a share user interface element used to share the personalized future event notification with a second user (e.g., share the personalized future event notification with the second user through a social media network, a text message, a shared calendar, etc.), and/or a comment user interface element used to comment on the personalized future event notification (e.g., the comment may be published along with the future event to a blog or social network). In an example, responsive to the user selecting the save user interface, a calendar creation option may be provided to the user. Responsive to the user selecting the calendar creation option, a calendar entry may be created for the future event within a calendar associated with the user.

In an example, interaction information regarding user interaction with the personalized future event notification and/or the personalized future event user interface may be collected. The interaction information may be utilized to train the future event detection model. For example, interaction information indicating that the user created an alert for the personalized future event notification (e.g., through the personalized future event user interface) may be utilized to train the future event detection model to identify similar future events and/or to rank similar future events higher for the user and/or other users with similar interests. At 510, the method 500 ends.

Figure 6A:
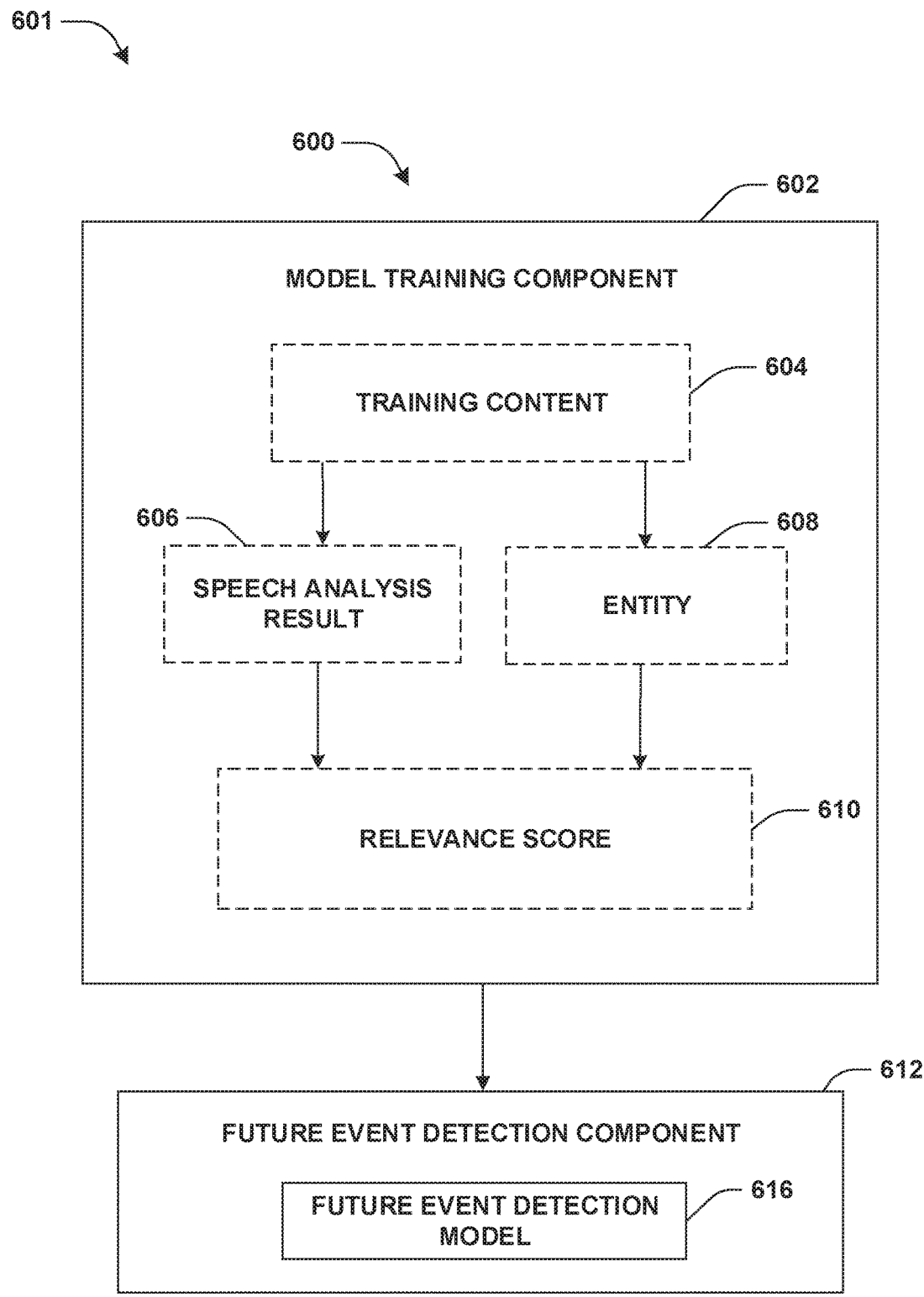
FIG. 6A is a component block diagram illustrating an example system for training a future event detection model, where the future event detection model is trained by a model training component.
Figure 6B:
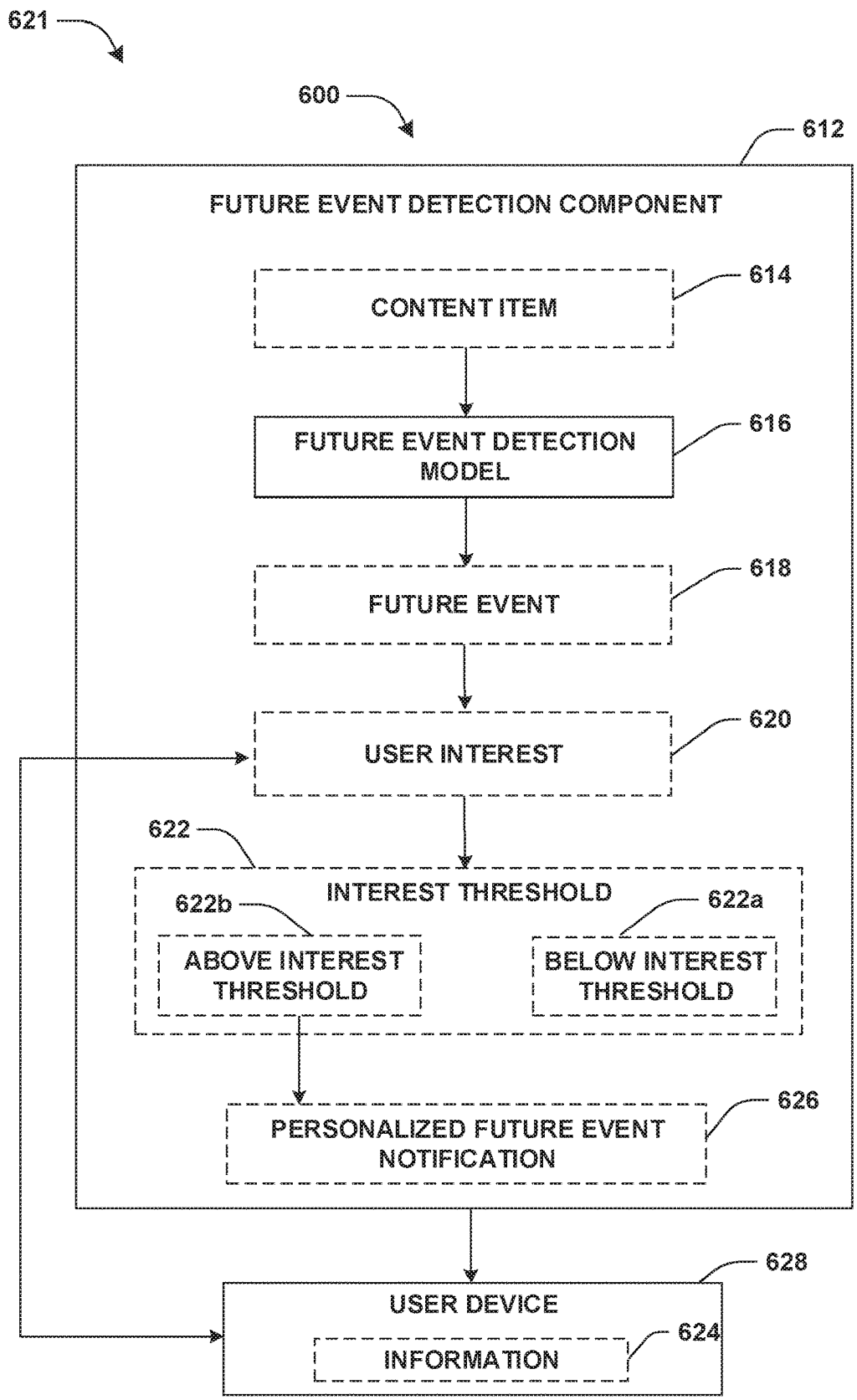
FIG. 6B is a component block diagram illustrating an example system for providing a personalized future event notification, where the personalized future event notification is provided by a future event detection component.

FIGS. 6A-6B illustrate the system 600 comprising a model training component 602 and/or a future event detection component 612. FIG. 6A illustrates an example 601 of the model training component 602 training a future event detection model 616 utilized by the future event detection component 612. The model training component 602 may be configured to perform a part of speech analysis on training content 604 (e.g., social network posts, websites, articles, news feeds, etc.) to generate a speech analysis result 606 that identifies at least one of a subject, a predicate, an object, or an adverbial clause corresponding to a location and/or a future time (e.g., June 12$^{th}$ at the Marina). The model training component 602 may be configured to perform an entity recognition analysis to extract an entity 608 relevant to a future event from the training content 604 (e.g., Aqua Land). The model training component 602 may be configured to assign a relevance score 610 between the entity 608 and the speech analysis result 606 to train a future event detection model 616 of the future event detection component 612 for future event detection (e.g., detection of an aquatic show hosted by Aqua Land at the Marina on June 12$^{th}$ and/or detection of similar events by Aqua Land and/or future events by similar entities).

FIG. 6B illustrates an example 621 of the future event detection component 612 providing a personalized future event notification 626 to a user of a user device 628. The future event detection component 612 may be configured to evaluate a content item 614 (e.g., a social network post "Water World is hosting a dolphin show at the New Marina on June 20$^{th}$") utilizing the future event detection model 616 to identify a future event 618 (e.g., the dolphin show). The future event detection component 612 may be configured to identify the user having a user interest 620 in the future event 618. In an example, the user interest 620 in the future event 618 may be below 622a an interest threshold 622 based upon user identifying information 624 (e.g., a social network post indicating that the user is bored by animals and sea life) being indicative of the user interest 620 in the future event 618. Responsive to determining that the user interest 620 is below 622a the interest threshold 622, the future event 618 may not be provided to the user 628. In another example, the user interest 620 in the future event 618 may be above 622b the interest threshold 622 based upon the user identifying information 624 (e.g., the user may routinely visit the New Marina and/or may have a strong interest in sea life) being indicative of the user interest 620 in the future event 618. Responsive to determining that the user interest 620 is above 622b the interest threshold 622, the future event detection component 612 may be configured to provide a personalized future event notification 626 to the user device 628. For example, the personalized future event notification 626 may comprise a text message with an electronic coupon for the dolphin show.

Figure 7:
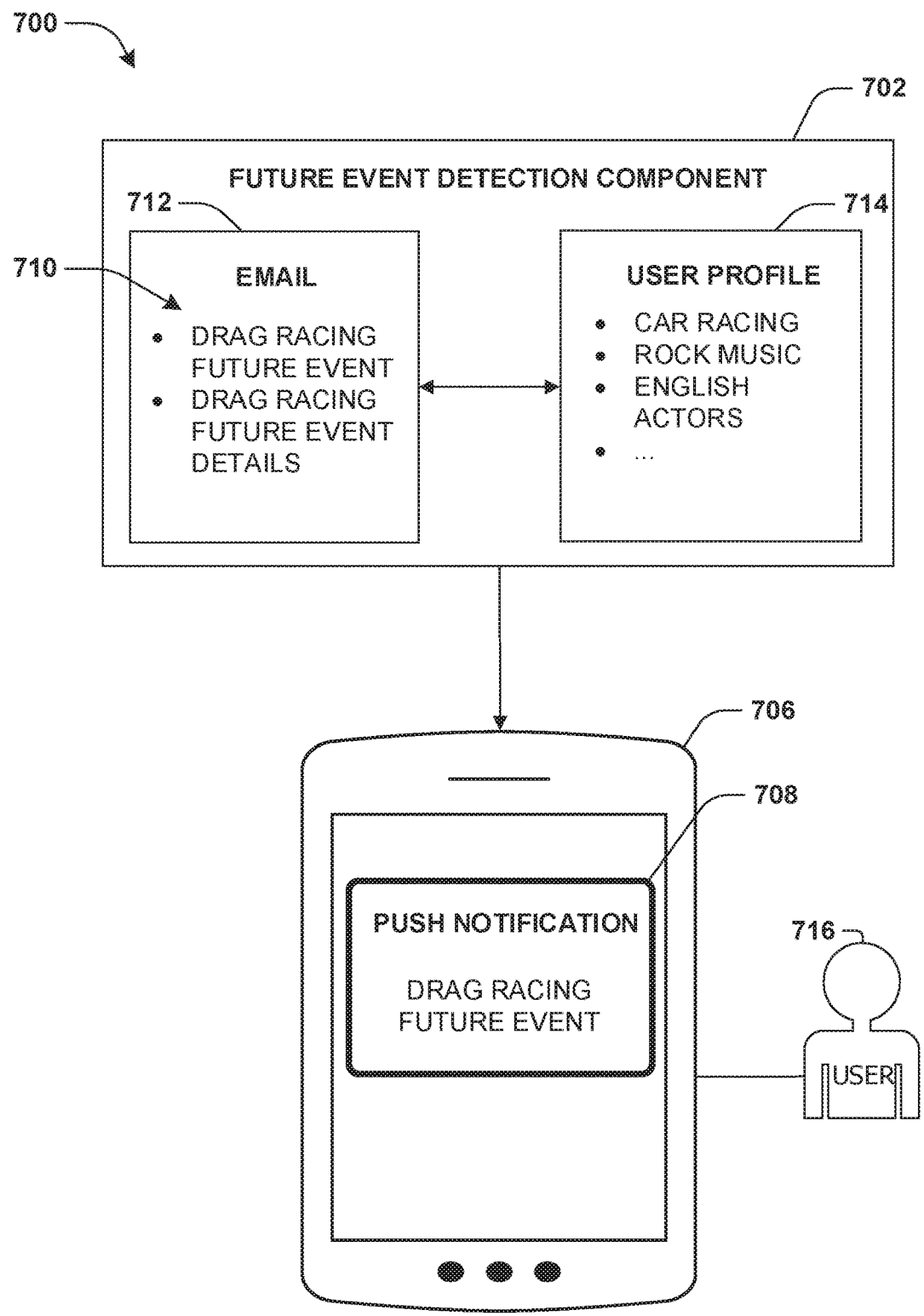
FIG. 7 is a component block diagram illustrating an example system for providing a push notification to a mobile device.

FIG. 7 illustrates a system 700 comprising a future event detection component 702 providing a push notification 708 for a drag racing future event 710 to a mobile device 706 of a user 716. In an example, the future event detection component 702 may utilize a future event detection model to evaluate an email message 712 to identify the drag racing future event 710. The future event detection component 702 may identify the user 716 as having a user interest corresponding to the drag racing future event 710 based upon car racing information identified within a user profile 714. The future event detection component 702 may construct the push notification 708 (e.g., a personalized future event notification) identifying the drag racing future event 710 (e.g., time, location, event details, a coupon, a link to a drag racing forum, etc.). The push notification 708 may be provided to the mobile device 706 for display to the user 716 as a device alert notification (e.g., a pop-up notification, a banner notification, etc.).

Figure 8A:
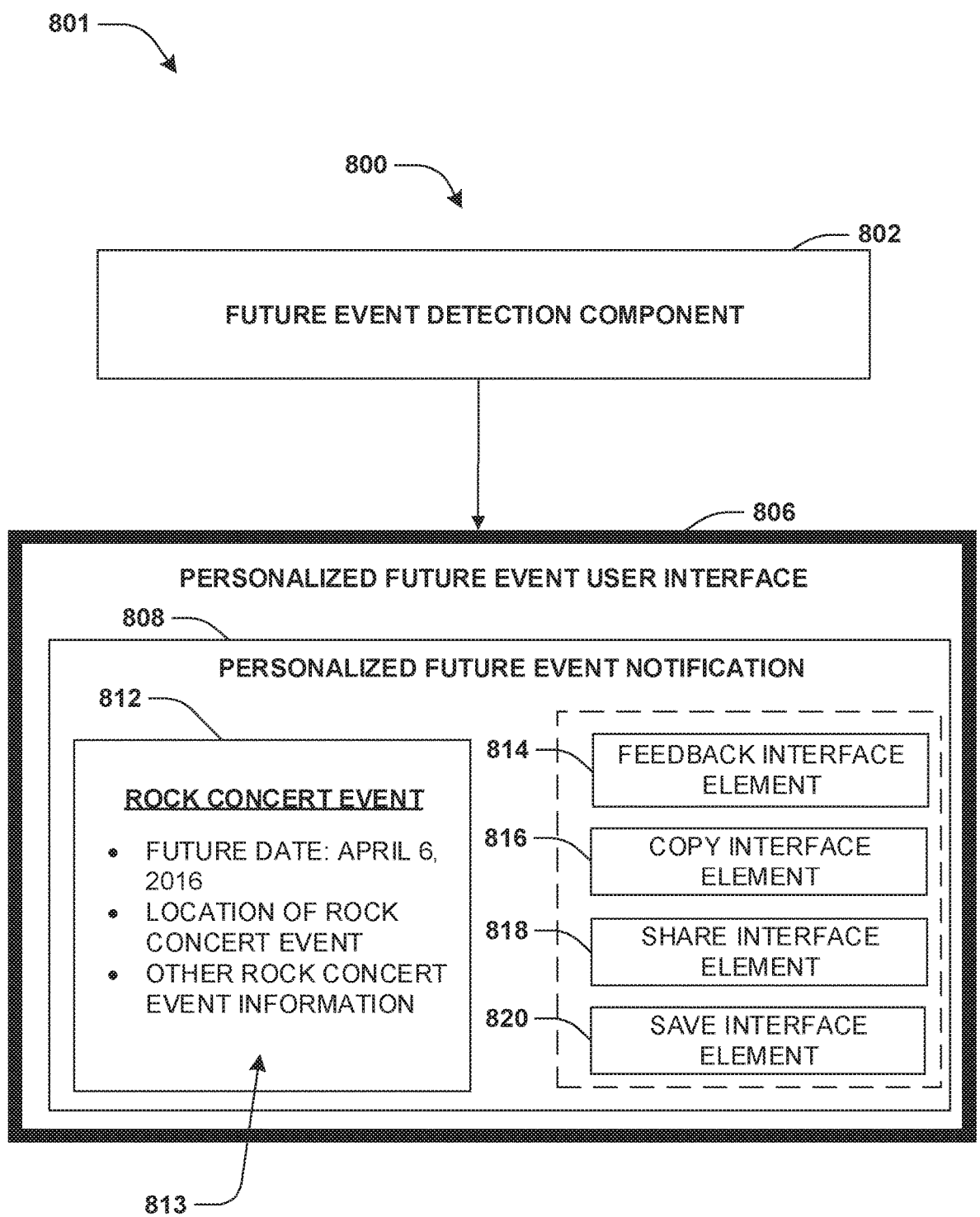
FIG. 8A is a component block diagram illustrating an example system for providing a personalized future event notification and a personalized future event user interface.
Figure 8B:
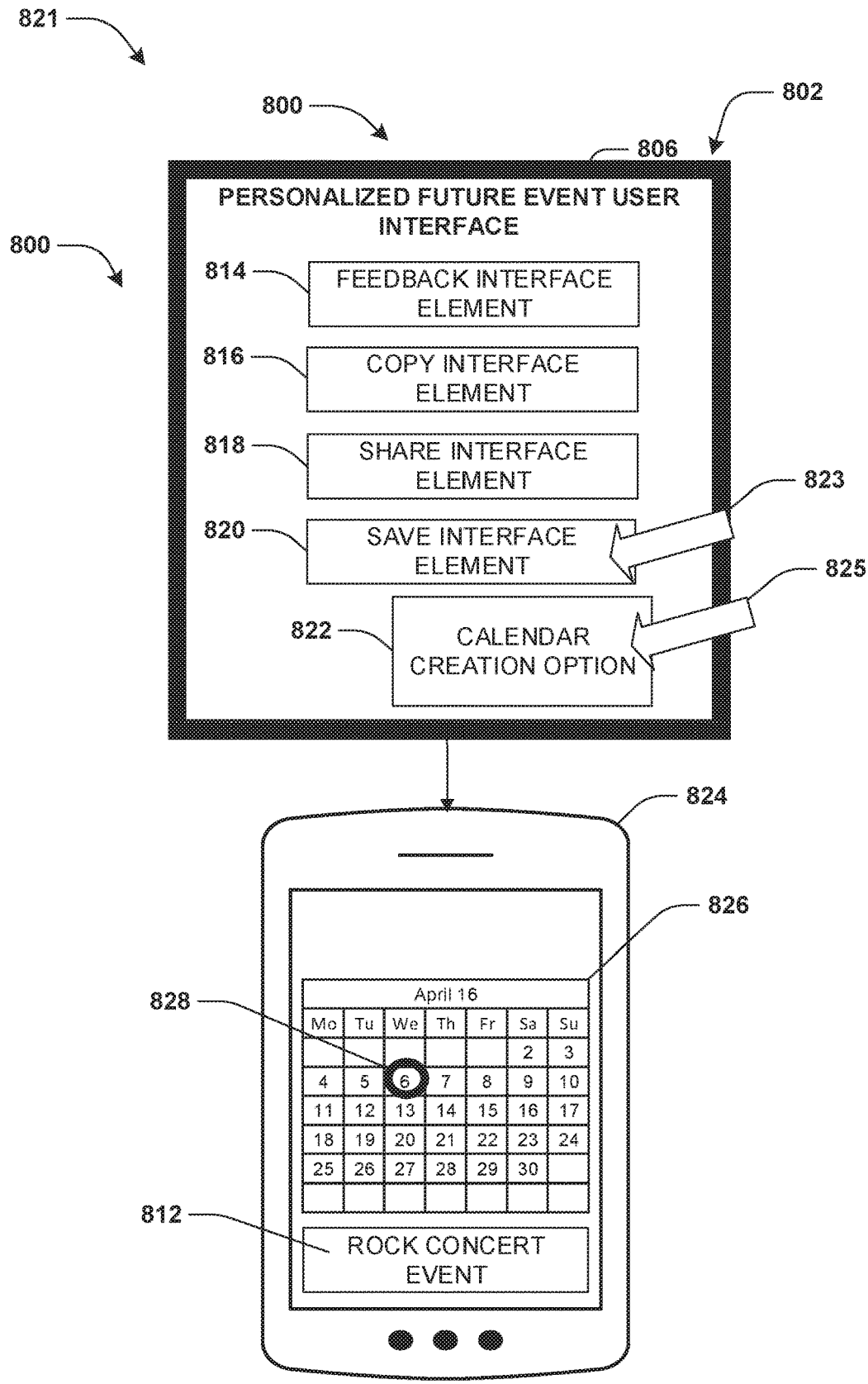
FIG. 8B is a component block diagram illustrating an example system for creating a calendar entry based upon the personalized future event notification.

FIGS. 8A-8B illustrate a system 800, comprising a future event detection component 802, configured to display a personalized future event user interface 806 to a user. FIG. 8A illustrates an example 801 of the future event detection component 802 displaying the personalized future event user interface 806. In an example, the personalized future event user interface 806 may be configured (e.g., by the future event detection component 802) to display a personalized future event notification 808, such as for a rock concert event 812. In an example, the personalized future event notification 808 may comprise rock concert event details 813, such as a date of the rock concert event, a time of the rock concert event, a location of the rock concert event, driving direction to the rock concert event, an attendee list (e.g., friends of the user attending the rock concert event, which may be derived from social network information, messages to the user, from an current attendee list on a rock concert venue website, etc.), a link to purchase tickets, and/or other relevant rock concert event details.

In an example, the personalized future event user interface 806 may be configured (e.g., by the future event detection component 802) to display a feedback user interface element 814 used to provide feedback for the personalized future event notification 808, a copy user interface element 816 used to copy the personalized future event notification 808 for pasting, a save user interface element 820 used to save the personalized future event notification 808 as a file, a bookmark, a task item, an email, a calendar entry, a reminder notification, etc., and/or a share user interface element 818 used to share the personalized future event notification 808 with a second user.

FIG. 8B illustrates an example 821 of the user performing a first selection 823 of the save user interface element 820. In an example, responsive to the first selection 823 of the save user interface element 820, a calendar creation option 822 may be provided (e.g., displayed) to the user. In an example, the user may perform a second selection 825 of the calendar creation option 822. Responsive to the second selection 825 of the calendar creation option 822, a calendar entry 828 may be created, for the rock concert event 812, within a calendar 826 on a mobile device 824 of the user. In an example, the calendar entry 828 may comprise the rock concert event details 813.

Figure 9:
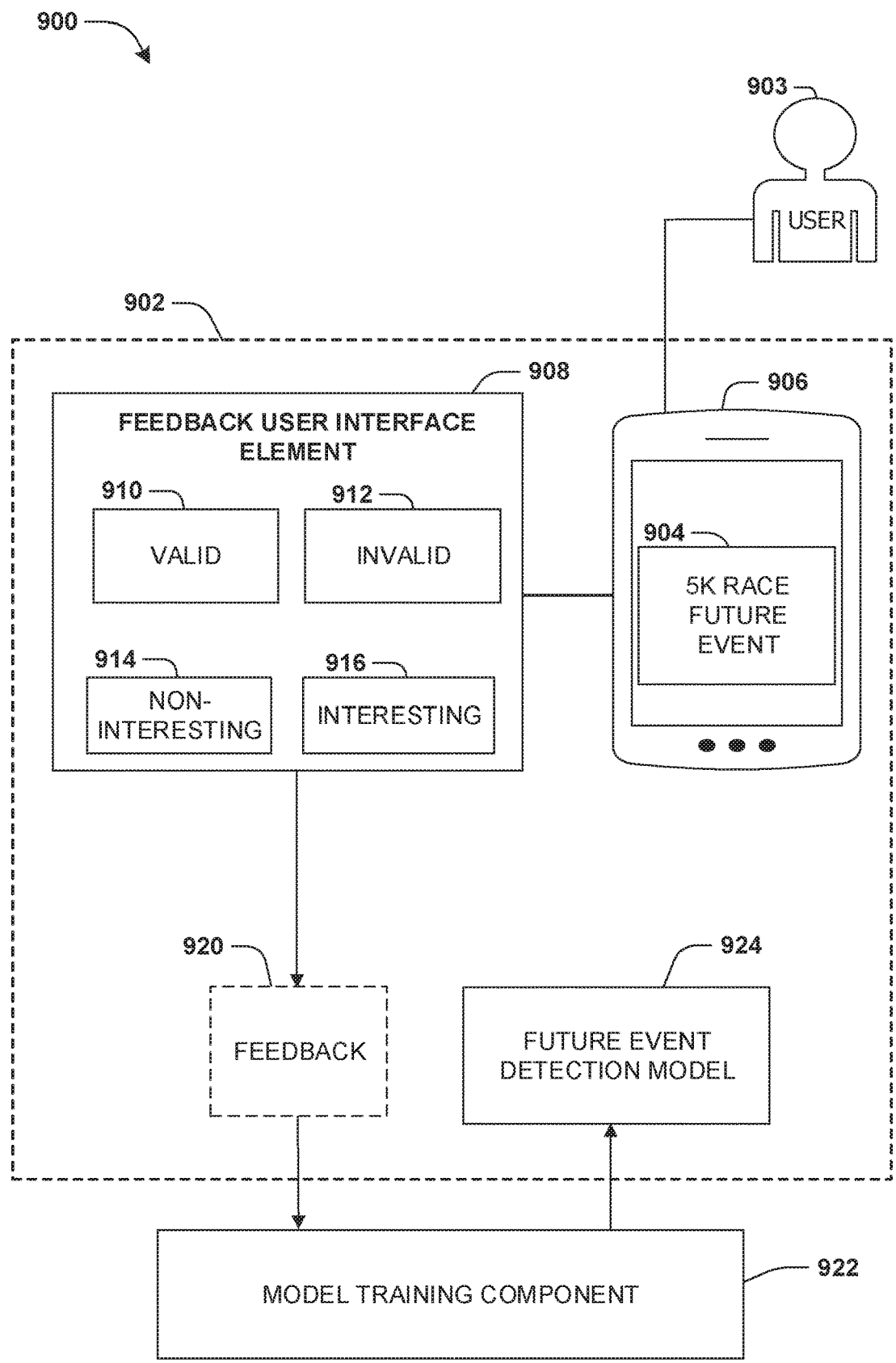
FIG. 9 is a component block diagram illustrating an example system for receiving feedback in response to a personalized future event notification being provided to a user.

FIG. 9 illustrates a system 900 comprising a future event detection component 902 configured to receive feedback 920 from a user 903 regarding a personalized future event notification 904 for a 5K race future event. In an example, the user 903 may provide feedback 920 through a feedback user interface element 908 displayed on the mobile device 906. In an example, the user 903 may indicate that the 5K race future event was at least one of a valid future event by selecting a valid option 910, an invalid future event by selecting an invalid option 912, an interesting future event by selecting an interesting option 916, and/or a non-interesting future event by selecting a non-interesting option 914 through the feedback user interface element 908.

In an example, responsive to receiving the feedback 920, a model training component 922 may be configured to train a future event detection model 924 of the future event detection component 902 based upon the feedback 920. For example, if the user 903 provides feedback 920 indicating that 5K race future event was invalid, then the future event detection model 924 may be trained by the model training component 922 to learn that locational features, temporal features, and/or entities were incorrectly used to identify the 5K race future event. In another example, if the user 903 provides feedback 920 indicating that the 5K race future event is a non-interesting future event, the future event detection model 924 may be trained by the model training component 922 to assign relatively lower ranks to the 5 k race future event and/or similar events for the user 903 and/or other users having similar interests as the user 903.

Figure 10:
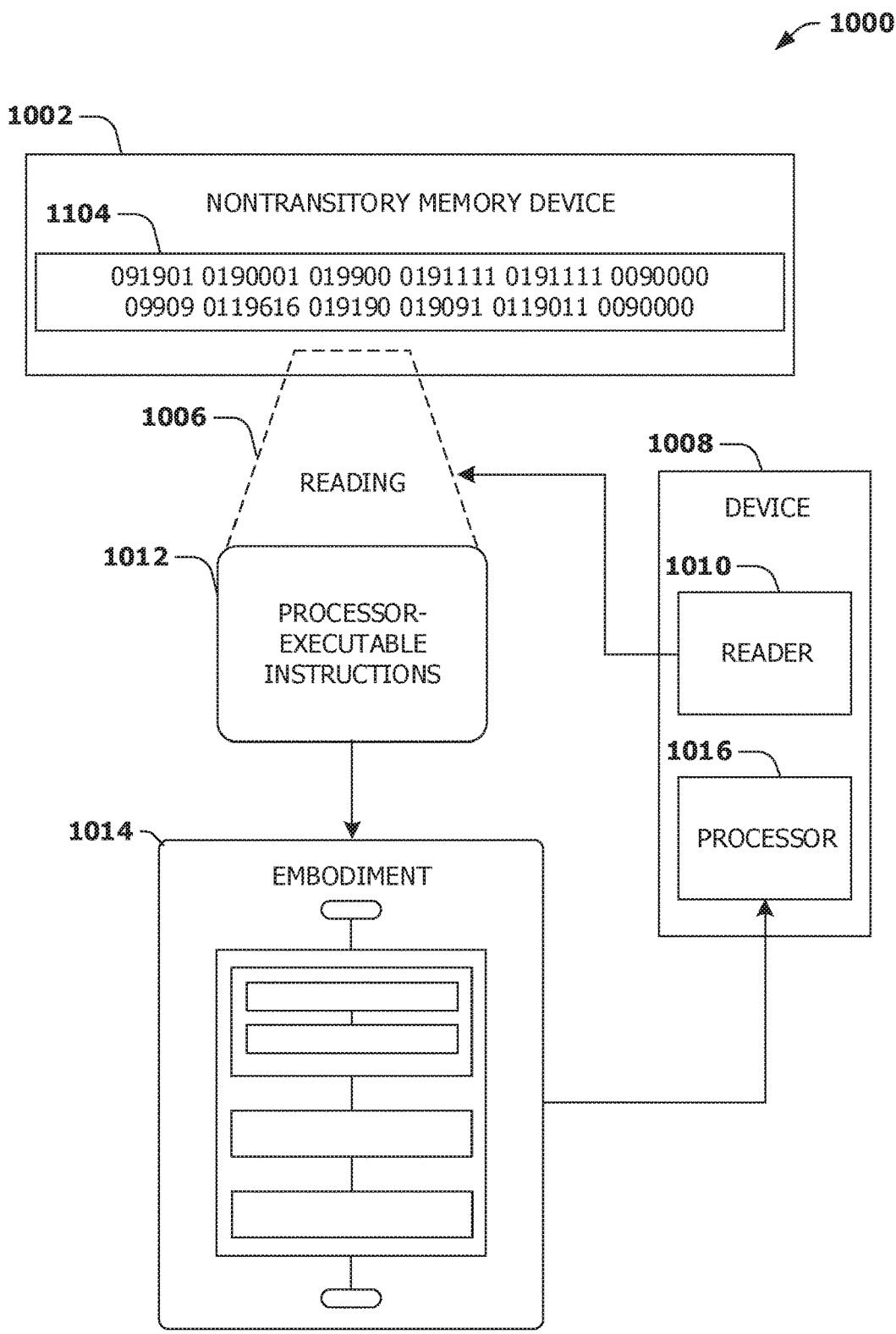
FIG. 10 is an illustration of a scenario featuring an example nontransitory memory device in accordance with one or more of the provisions set forth herein.

FIG. 10 is an illustration of a scenario 1000 involving an example nontransitory memory device 1002. The nontransitory memory device 1002 may comprise instructions that when executed perform at least some of the provisions herein. The nontransitory memory device 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 1002 stores computer-readable data 1004 that, when subjected to reading 1006 by a reader 1010 of a device 1008 (e.g., a read head of a hard disk drive, or a read operation invoked on a solid-state storage device), express processor-executable instructions 1012. In some embodiments, the processor-executable instructions, when executed on a processor 1016 of the device 1008, are configured to perform a method, such as at least some of the example method 400 of FIG. 4, and/or at least some of the example method 500 of FIG. 5, for example. In some embodiments, the processor-executable instructions, when executed on the processor 1016 of the device 1008, are configured to implement a system, such as at least some of the example system 600 of FIGS. 6A-6B, at least some of the example system 700 of FIG. 7, at least some of example system 800 of FIGS. 8A-8B, and/or at least some of the example system 900 of FIG. 9, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A non-transitory machine readable medium having stored thereon processor-executable instructions that when executed cause performance of operations, the operations comprising:
   performing part of speech analysis on training content to generate a speech analysis result that identifies at least one of a subject, a predicate, an object, or an adverbial clause corresponding to at least one of a location or a future time;
   performing entity recognition analysis to extract an entity relevant to a future event from the training content;
   assigning a relevance score between the entity of the training content and the speech analysis result of the training content; and
   training, based upon the relevance score, a future event detection model for future event detection.

2. The non-transitory machine readable medium of claim 1, the operations comprising:

evaluating a content item utilizing the future event detection model to identify the future event.

3. The non-transitory machine readable medium of claim 2, the operations comprising:
identifying a user having a user interest in the future event above an interest threshold based upon user identifying information being indicative of the user interest in the future event.

4. The non-transitory machine readable medium of claim 3, the operations comprising:
providing a personalized future event notification for the future event to the user.

5. The non-transitory machine readable medium of claim 4, the operations comprising:
displaying a feedback user interface element used to provide feedback based upon the personalized future event notification.

6. The non-transitory machine readable medium of claim 4, the operations comprising:
displaying a copy user interface element used to copy the personalized future event notification for pasting.

7. The non-transitory machine readable medium of claim 4, the operations comprising:
displaying a share interface element used to share the personalized future event notification with a second user.

8. The non-transitory machine readable medium of claim 4, the operations comprising:
displaying a save interface element used to save the personalized future event notification.

9. The non-transitory machine readable medium of claim 4, the operations comprising:
displaying a save interface element used to save the personalized future event notification as at least one of a file, a bookmark, a task item, an email, a calendar item, or a reminder notification.

10. The non-transitory machine readable medium of claim 4, the operations comprising:
receiving feedback from the user regarding the personalized future event notification.

11. The non-transitory machine readable medium of claim 10, the operations comprising:
training the future event detection model based upon the feedback.

12. The non-transitory machine readable medium of claim 4, the operations comprising:
providing a calendar creation option to the user; and
responsive to the user selecting the calendar creation option, creating a calendar entry, of the future event, within a calendar associated with the user.

13. A method comprising:
performing part of speech analysis on training content to generate a speech analysis result that identifies at least one of a subject, a predicate, an object, or an adverbial clause corresponding to at least one of a location or a future time;
performing entity recognition analysis to extract an entity relevant to a future event from the training content;
assigning a relevance score between the entity of the training content and the speech analysis result of the training content; and
training, based upon the relevance score, a future event detection model for future event detection.

14. The method of 13, the future event detection model comprising at least one of:
a Gradient Boosting Decision Tree (GBDT) model or an XQuery Data Model (XDM).

15. The method of claim 13, comprising:
evaluating a content item utilizing the future event detection model to identify the future event;
identifying a user having a user interest in the future event above an interest threshold based upon user identifying information being indicative of the user interest in the future event; and
providing a personalized future event notification for the future event to the user.

16. A system, comprising:
a processor; and
memory comprising processor-executable instructions that when executed by the processor cause the processor to perform operations, the operations comprising:
performing part of speech analysis on training content to generate a speech analysis result that identifies at least one of a subject, a predicate, an object, or an adverbial clause corresponding to at least one of a location or a future time;
performing entity recognition analysis to extract an entity relevant to a future event from the training content;
assigning a relevance score between the entity of the training content and the speech analysis result of the training content; and
training, based upon the relevance score, a future event detection model for future event detection.

17. The system of claim 16, the operations comprising:
evaluating a content item utilizing the future event detection model to identify the future event;
identifying a user having a user interest in the future event above an interest threshold based upon user identifying information being indicative of the user interest in the future event; and
providing a personalized future event notification for the future event to the user.

18. The system of claim 17, the operations comprising at least one of:
displaying a feedback user interface element used to provide feedback based upon the personalized future event notification;
displaying a copy user interface element used to copy the personalized future event notification for pasting;
displaying a share interface element used to share the personalized future event notification with a second user; or
displaying a save interface element used to save the personalized future event notification as at least one of a file, a bookmark, a task item, an email, a calendar item, or a reminder notification.

19. The system of claim 17, the operations comprising:
receiving feedback from the user regarding the personalized future event notification; and
training the future event detection model based upon the feedback.

20. The system of claim 17, the operations comprising:
providing a calendar creation option to the user; and
responsive to the user selecting the calendar creation option, creating a calendar entry, of the future event, within a calendar associated with the user.

* * * * *